(12) United States Patent
Sandhu et al.

(10) Patent No.: US 7,440,510 B2
(45) Date of Patent: Oct. 21, 2008

(54) MULTICARRIER TRANSMITTER, MULTICARRIER RECEIVER, AND METHODS FOR COMMUNICATING MULTIPLE SPATIAL SIGNAL STREAMS

(75) Inventors: Sumeet Sandhu, San Jose, CA (US); Lei Shao, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 944 days.

(21) Appl. No.: 10/880,158

(22) Filed: Jun. 28, 2004

(65) Prior Publication Data

US 2005/0058217 A1    Mar. 17, 2005

Related U.S. Application Data

(60) Provisional application No. 60/503,092, filed on Sep. 15, 2003, provisional application No. 60/536,071, filed on Jan. 12, 2004.

(51) Int. Cl.
*H04B 7/06* (2006.01)
*H04B 7/08* (2006.01)

(52) U.S. Cl. .................. 375/267; 375/265; 375/347

(58) Field of Classification Search ......... 375/260–262, 375/265, 267, 298, 299, 340, 341, 347; 370/206, 370/208, 210
See application file for complete search history.

(56) References Cited

U.S. PATENT DOCUMENTS

| | | | |
|---|---|---|---|
| 5,311,456 A | 5/1994 | Chiang et al. | |
| 5,485,221 A | 1/1996 | Banker et al. | |
| 5,610,908 A * | 3/1997 | Shelswell et al. | ........... 370/210 |
| 5,907,812 A | 5/1999 | Van De Berg | |
| 5,960,351 A | 9/1999 | Przelomiec | |
| 6,256,290 B1 | 7/2001 | Ramesh | |
| 6,421,333 B1 | 7/2002 | Jalali | |
| 6,430,441 B1 | 8/2002 | Levine | |
| 6,452,981 B1 | 9/2002 | Raleigh et al. | |
| 6,459,690 B1 | 10/2002 | Le et al. | |
| 6,510,150 B1 | 1/2003 | Ngo | |
| 6,529,488 B1 | 3/2003 | Urs et al. | |
| 6,598,200 B1 | 7/2003 | Greenwood et al. | |
| 6,775,261 B1 | 8/2004 | Banister | |
| 6,856,611 B2 | 2/2005 | Chaudhuri et al. | |

(Continued)

FOREIGN PATENT DOCUMENTS

EP    0939527 A1    9/1999

(Continued)

OTHER PUBLICATIONS

"802.11g™ IEEE Local and Metropolitan Area Networks; Part 11: Wireless LAN Medium Access Control (MAC) and Physical Layer (PHY) specifications; Amendment 4:Further Higher Data Rate extension in the 2.4 GHz Band", *IEEE Std. 802.11Gtm-2003*, The Institute of Electrical and Electronics Engineers, Inc. NY,(Jun. 27, 2003), 78 pgs.

(Continued)

*Primary Examiner*—Young T. Tse
(74) *Attorney, Agent, or Firm*—Schwegman, Lundberg & Woessner, P.A.; Gregory J. Gorrie (57) ABSTRACT

A multicarrier transmitter includes a space-frequency interleaver and a space-frequency coder to encode multicarrier signals for transmission over a plurality of spatial channels.

31 Claims, 3 Drawing Sheets

U.S. PATENT DOCUMENTS

| | | | |
|---|---|---|---|
| 6,912,204 | B2 | 6/2005 | Kossi et al. |
| 6,985,434 | B2 * | 1/2006 | Wu et al. .................... 370/208 |
| 7,089,577 | B1 | 8/2006 | Rakib et al. |
| 7,158,769 | B2 | 1/2007 | Okanoue et al. |
| 7,224,744 | B2 | 5/2007 | Giannakis et al. |
| 7,289,585 | B2 | 10/2007 | Sandhu et al. |
| 7,315,577 | B2 | 1/2008 | Shao |
| 7,324,605 | B2 | 1/2008 | Maltsev et al. |
| 7,333,556 | B2 | 2/2008 | Maltsev et al. |
| 2001/0031014 | A1 | 10/2001 | Subramanian et al. |
| 2001/0031016 | A1 | 10/2001 | Seagraves |
| 2001/0033611 | A1 | 10/2001 | Grimwood et al. |
| 2002/0009055 | A1 | 1/2002 | Sugaya |
| 2002/0009155 | A1 | 1/2002 | Tzannes |
| 2002/0136328 | A1 | 9/2002 | Shimizu |
| 2002/0173271 | A1 | 11/2002 | Blair et al. |
| 2003/0043732 | A1 | 3/2003 | Walton et al. |
| 2003/0054827 | A1 | 3/2003 | Schmidl et al. |
| 2003/0083703 | A1 | 5/2003 | Zhu et al. |
| 2003/0087645 | A1 | 5/2003 | Kim et al. |
| 2003/0095533 | A1 | 5/2003 | Joo et al. |
| 2003/0125040 | A1 | 7/2003 | Walton et al. |
| 2003/0139196 | A1 | 7/2003 | Medvedev et al. |
| 2003/0161282 | A1 | 8/2003 | Medvedev et al. |
| 2003/0185166 | A1 | 10/2003 | Belcea |
| 2003/0204210 | A1 | 10/2003 | Ousdigian et al. |
| 2003/0206559 | A1 | 11/2003 | Trachewsky et al. |
| 2003/0208241 | A1 | 11/2003 | Bradley et al. |
| 2003/0223354 | A1 | 12/2003 | Olszewski |
| 2004/0001429 | A1 | 1/2004 | Ma |
| 2004/0008661 | A1 | 1/2004 | Myles et al. |
| 2004/0032354 | A1 | 2/2004 | Knobel et al. |
| 2004/0057539 | A1 | 3/2004 | Boles et al. |
| 2004/0085917 | A1 | 5/2004 | Fitton et al. |
| 2004/0120274 | A1 * | 6/2004 | Petre et al. .................. 370/320 |
| 2004/0136349 | A1 | 7/2004 | Walton et al. |
| 2004/0136438 | A1 | 7/2004 | Fullerton et al. |
| 2004/0142696 | A1 | 7/2004 | Saunders et al. |
| 2004/0177162 | A1 | 9/2004 | Wetzel et al. |
| 2004/0185786 | A1 | 9/2004 | Mirbaha et al. |
| 2004/0192208 | A1 | 9/2004 | Kong et al. |
| 2004/0235529 | A1 | 11/2004 | Tarokh et al. |
| 2004/0248530 | A1 | 12/2004 | Rakib et al. |
| 2004/0258174 | A1 | 12/2004 | Shao et al. |
| 2005/0020237 | A1 * | 1/2005 | Alexiou et al. .............. 455/403 |
| 2005/0031047 | A1 | 2/2005 | Maltsev et al. |
| 2005/0058159 | A1 | 3/2005 | Chapman |
| 2005/0058212 | A1 | 3/2005 | Shao |
| 2005/0088959 | A1 | 4/2005 | Kadous |
| 2005/0090250 | A1 | 4/2005 | Backes |
| 2005/0111424 | A1 * | 5/2005 | Tsai et al. .................... 370/342 |
| 2005/0114489 | A1 | 5/2005 | Yonge et al. |
| 2005/0128936 | A1 | 6/2005 | Shao |
| 2005/0138194 | A1 | 6/2005 | Lu et al. |
| 2005/0141412 | A1 | 6/2005 | Sadri et al. |
| 2005/0152299 | A1 | 7/2005 | Stephens |
| 2005/0152330 | A1 | 7/2005 | Stephens et al. |
| 2005/0152357 | A1 | 7/2005 | Stephens |
| 2005/0152465 | A1 | 7/2005 | Maltsev et al. |
| 2005/0152466 | A1 | 7/2005 | Maltsev et al. |
| 2005/0152473 | A1 | 7/2005 | Maltsev et al. |
| 2005/0152484 | A1 | 7/2005 | Sandhu et al. |
| 2005/0154957 | A1 | 7/2005 | Jacobsen |
| 2005/0154958 | A1 | 7/2005 | Xia et al. |
| 2005/0166131 | A1 | 7/2005 | Xia et al. |
| 2005/0174927 | A1 | 8/2005 | Stephers et al. |
| 2005/0215264 | A1 | 9/2005 | Subramaniam et al. |
| 2005/0245197 | A1 | 11/2005 | Kadous et al. |
| 2006/0029146 | A1 * | 2/2006 | Catreux et al. .............. 375/267 |
| 2006/0087972 | A1 | 4/2006 | Jalali et al. |
| 2006/0135081 | A1 * | 6/2006 | Mysore et al. .............. 455/70 |
| 2006/0166619 | A1 | 7/2006 | Roberts |
| 2007/0086536 | A1 | 4/2007 | Ketchum et al. |
| 2007/0154221 | A1 | 7/2007 | McNicol et al. |

FOREIGN PATENT DOCUMENTS

| | | | |
|---|---|---|---|
| EP | 1187506 | A1 | 3/2002 |
| EP | 1240918 | A2 | 9/2002 |
| EP | 1411647 | A2 | 4/2004 |
| EP | 1533963 | A2 | 5/2005 |
| GB | 2384651 | | 7/2003 |
| WO | WO-97/37441 | A1 | 10/1997 |
| WO | WO-97/47147 | A1 | 12/1997 |
| WO | WO-01/59965 | A1 | 8/2001 |
| WO | WO-01/95579 | A2 | 12/2001 |
| WO | WO-03/001702 | A1 | 1/2003 |
| WO | WO-03/047198 | A2 | 6/2003 |
| WO | WO-2004/047354 | A1 | 6/2004 |
| WO | WO-2005/025471 | A1 | 3/2005 |
| WO | WO-2005/029758 | A2 | 3/2005 |
| WO | WO-2005/029759 | A2 | 3/2005 |
| WO | WO-2005/034435 | A2 | 4/2005 |
| WO | WO-2005/067171 | A1 | 7/2005 |
| WO | WO-2005/069572 | A1 | 7/2005 |
| WO | WO-2005/069573 | A1 | 7/2005 |
| WO | WO-2005/069667 | A1 | 7/2005 |
| WO | WO-2005/071871 | A1 | 8/2005 |
| WO | WO-2005/071910 | A1 | 8/2005 |
| WO | WO-2005/071912 | A1 | 8/2005 |
| WO | WO-2005/122515 | A1 | 12/2005 |

OTHER PUBLICATIONS

"International Search Report for corresponding PCT Application No. PCT/US2004/029768",(Mar. 10, 2005), 6 pgs.

"Supplement to IEEE Standard for Information Technology- Telecommunications and Information Exchange Between Systems- Local and Metropolitan Area Networks—Specific Requirements—Part 11: Wireless LAN Medium Access Control (MAC) and Physical Layer (PHY)", *IEEE Std. 802.11a-1999*, IEEE Computer Society, New York, NY,(1999 (reaffirmed Jun. 12, 2003)), 91 pgs.

"Supplement to IEEE Standard for IT-Telecomm. & Info. Exchange Between Systems—Local and Metropolitan Area Networks—specific requirements. Part 11:Wireless LAN Medium Access Control(MAC)and Physical Layer(PHY)Specs:High-speed Physical Layer in 5GHZ Band", *IEEE Std. 802.11a-1999*, (Dec. 30, 1999), 90 pgs.

Abdul Aziz, M. K., et al., "Indoor Throughput and Range Improvements Using Standard Compliant AP Antenna Diversity in IEEE 802.11a and ETSI HiperLAN/2", *VTC 2001 Fall. IEEE VTS 54th Vehicular Technology Conference, 2001, vol. 4*, (Oct. 7-11, 2001), 2294-2298.

Bangerter, B., et al., "High-Throughput Wireless LAN Air Interface", *Intel Technology Journal*, 7(3), http://developer.intel.com/technology/itj/index.htm,(Aug. 9, 2003), 47-57.

Böhnke, R., et al., "Reduced Complexity MMSE Detection for BLAST Architectures", *GLOBECOM 2003—IEEE Global Telecommunication Conferrence Proceedings*, 7 (7), (Dec. 1, 2003), 2258-2262.

Bölcskei, H., "Space-Frequency Coded MIMO-OFDM with variable Multiplexing-Diversity Tradeoff", *IEEE International Conference on Communications*, 4, (May 11, 2003), 2837-2841.

Choi, B., et al., "Optimum Mode-Switching-Assisted Constant-Power Single- and Multicarrier Adaptive Modulation", *IEEE Transactions on Vehicular Technology*, 52(3), (May 2003), 536-560.

Chung, C., et al., "Estimation of delay offset in multi-carrier differential phase modulation systems", *Communication Technology Proceedings of ICCT2003*, 2, (Apr. 9, 2003), 1848-1851.

Cioffi, J. M., "Chapter 4—Multi-Channel Modulation", *Lectures on Digital Communications, Standard University*, Available from http://www.stanford.edu/class/ee379c/, (2001), 278-314.

Damen, M. O., et al., "On Maximum-Likelihood Detection and the Search for the Closest Lattice Point", *IEEE Transactions on Information Theory, IEEE Inc.* 49 (10), (Oct. 1, 2003), 2389-2402.

Dammann, A., et al., "Transmit/Receive—Antenna—Diversity Techniques For OFDM Systems", *European Transactions on Telecommunications*, 13 (5), Multi-Carrier Spread-Spectrum and Related Topics, (Sep. 2002), 531-538.

Fujino, Y., et al., "Transmitter With Antenna Array For MC-CDMA Forward Link", *IEEE Antennas and Propagation Society International Symposium*, (Jun. 22, 2003), 847-850.

Higuchi, K., et al., "Adaptive Selection of Surviving Symbol Replica Candidates Based on Maximum Reliability in QRM-MLD for OFCDM MIMO Multiplexing", *Proceedings, IEEE Global Telecommunications Conference (GLOBECOM '04)*, (Nov. 29, 2004), 2480-2486.

Hutter, A. A., et al., "Effects of Fading Correlation on Multiple Antenna Reception Mobile OFDM Systems", *IEEE Vehicular Technology Conference*, (Sep. 24, 2000), 2744-2749.

Leke, A., et al., "A maximum rate loading algorithm for discrete multitone modulation systems", *GLOBECOM '97, Global Telecommunications Conference, 1997, vol. 3*, (Nov. 8, 1997), 1514-1518.

Ma, X., "Complex Field Coded MIMO Systems: Performance, Rate, and Trade-Offs", *Wireless Communications and Mobile Computing*, 2, (Oct. 2002), 693-717.

Paulraj, A., *Introduction to Space-Time Wireless Communications*, Cambridge University Press, Cambridge, UK,(May 2003), 4 pgs.

Rende, D., et al., "Bit Interleaved Space-frequency Coded Modulation for OFDM Systems", *IEE International Conference on Communication, Vol. 1 of 5*, Wireless Information and Networking Group, (ICC 2003), (May 11, 2003), 2827-2831.

Sampath, H., et al., "Linear Precoding and Decoding for Multiple Input Multiple Output(MIMO) Wireless Channels", Dissertation, Doctor Philosophy, Department of Electrical Engineering, Stanford University (Apr. 2001), 157 pgs.

Sandhu, S., et al., "Analog Combining of Multiple Receive Antennas With OFDM", *IEEE International Conference on Communications*, (May 11, 2003), 3428-3432.

Seethaler, D., et al., "Efficient Approximate-ml Detection for Mimo Spatial Multiplexing Systems by Using a 1-D Nearest Neighbor Search", *Proceedings of the 3rd IEEE International Symposium on Signal Processing and Information Technology (ISSPIT 2003)*, (Dec. 14, 2003),290-293.

Shao, L., "High Rate Space Frequency Block Codes for Next Generation 802.11 WLANs", *IEEE International Conference on Communications*, 5, (Jun. 20, 2004), 2995-2999.

Simoens, S., et al., "Optimum Performance of Link adaptation in HiperLAN/2 networks", *IEEE 53rd Vehicular Technology Conference, (VTC, 2001) vol. 2 of 4*, (May 6-9, 2001), 1129-1133.

Slimane, B. S., "A Low Complexity Antenna Diversity Receiver For OFDM Based Systems", *IEEE International Conference on Communications*, (Jun. 6, 2001), 1147-1151.

Tian, Q., et al., "The Performance of Multi-Carrier CDMA with Base Station Antenna Arrays in Fading Channels", *Vehicular Technology Conference*, (May 15, 2000), 1498-1502.

Wang, Z., "Complex-Field Coding for OFDM Over Fading Wireless Channels", *IEEE Transactions on Information Theory*, 49(2), (Mar. 2003), 707-720.

Yih, C. H., et al., "Adaptive Modulation, Power Allocation and Control for OFDM Wireless Networks", *IEEE 11th Annual Symposium on Personal, Indoor and Mobile Radio Communication*, 2, (Sep. 18, 2000), 809-813.

Yuan, H., et al., "An Adaptive Array Antenna with Path Selection of OFDM Signal", *European Personal Mobile Communications Conference,*, (Apr. 22, 2003),412-416.

Yue, J., et al., "Channel Estimation and Data Detection for MIMO-OFDM Systems", *Proceedings, IEEE Global Telecommunications Conference. (GLOBECOM '03)*, 7(7), (Dec. 1, 2003), 581-585.

Zhen, L., et al., "A Modified Sub-Optimum Adaptive Bit and Power Allocation Algorithm in Wideband OFDM System", *Canadian Conference on Electrical and Computer Engineering, (CCECE 2003), Vol. 3 of 3*, (May 4, 2003), 1589-1592.

\* cited by examiner

MULTICARRIER TRANSMITTER, MULTICARRIER RECEIVER, AND METHODS FOR COMMUNICATING MULTIPLE SPATIAL SIGNAL STREAMS

CROSS-REFERENCE TO RELATED APPLICATIONS

This application claims the benefit of priority under 35 U.S.C. 119(e) to U.S. Provisional Patent Application Ser. No. 60/503,092, filed Sep. 15, 2003, and to U.S. Provisional Patent Application Ser. No. 60/536,071, filed Jan. 12, 2004, both of which are incorporated herein by reference.

TECHNICAL FIELD

Embodiments of the present invention pertain to wireless communications, and in some embodiments, to multicarrier communication systems.

BACKGROUND

To increase the data rate and/or throughput of wireless communications, wireless signals may be transmitted using more than one transmit antenna over more than one spatial channel utilizing the same frequency subcarriers of a multicarrier communication channel. These systems are sometimes referred to multiple-input multiple-output (MIMO) systems and may exploit the multipath diversity of the antennas. Conventional MIMO systems may encode the signals using convolutional encoding and/or Viterbi encoding, however these techniques are sensitive to antenna separation and antenna fading correlation.

Thus there are general needs for apparatus and methods for increasing the data rate and/or throughput of wireless communication systems.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
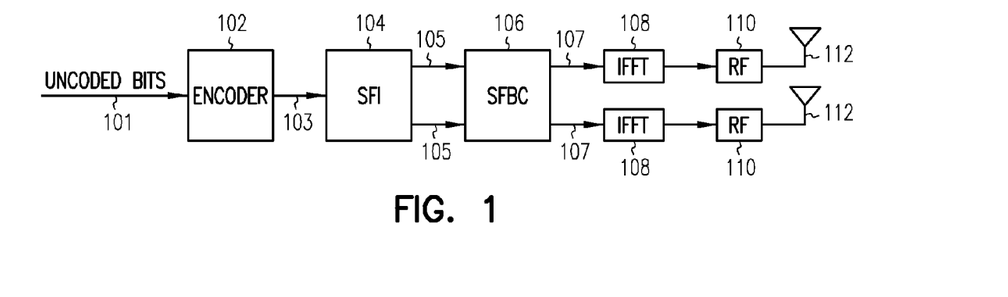
FIG. 1 is a block diagram of a multicarrier transmitter in accordance with some embodiments of the present invention.

FIG. 1 is a block diagram of a multicarrier transmitter in accordance with some embodiments of the present invention. Multicarrier transmitter 100 may be part of a wireless communication device and may transmit multicarrier communication signals, such as orthogonal frequency division multiplexed (OFDM) communication signals, over a multicarrier communication channel.

In some embodiments, multicarrier transmitter 100 encodes symbols for transmission on a multicarrier communication channel comprising more than one spatial channel and may use more than one of transmit antennas 112. In some embodiments, multicarrier transmitter 100 uses space-frequency interleaving and/or high-throughput space-frequency block coding which may reduce the need for convolutional or error-correcting coding, although the scope of the present invention is not limited in this respect. In some embodiments, the use of space-frequency interleaving and/or high-throughput space-frequency block coding by multicarrier transmitter 100 may reduce the need for Viterbi decoding, although the scope of the invention is not limited in this respect. In some embodiments, increased throughput and/or increased range may be achieved through the use of space-frequency interleaving and/or high-throughput space-frequency block coding over conventional systems using convolutional codes with similar bit-error rates and bandwidths.

In some embodiments, multicarrier transmitter 100 may comprise space-frequency interleaver (SFI) 104 to perform a space-frequency interleaving on bits of bit sequence 103. In some embodiments, multicarrier transmitter 100 may also comprise space-frequency block coder (SFBC) 106 to precode symbols of symbol vectors 105 and map the precoded symbols to one of the spatial channels and to one of the subcarriers of a multicarrier communication channel. In some embodiments, bit sequence 103 may be an encoded bit sequence, included a bit sequence encoded with a forward error correcting (FEC) code, although the scope of the invention is not limited in this respect. In some embodiments, the symbols of symbol vectors 105 may be coded symbols, including coded quadrature amplitude modulated (QAM) symbols or FEC-coded QAM symbols, although the scope of the invention is not limited in this respect.

In some embodiments, space-frequency interleaver 104 may assign two or more non-sequential bits of bit sequence 103 to matrix positions of an interleaver matrix. The two or more bits assigned to each matrix position may comprise a symbol, such as a QAM symbol, although the scope of the invention is not limited in this respect. In some embodiments, space-frequency interleaver 104 may assign sequential bits of bit sequence 103 diagonally within frequency blocks of the interleaver matrix, and space-frequency block coder 106 may select the coded symbols of symbol vectors 105 for preceding together from diagonal positions within more than one frequency block of the interleaver matrix. In some embodiments, space-frequency block coder 106 may select the coded symbols of symbol vectors 105 for precoding together from other and/or different diagonal positions of the interleaver matrix. These embodiments, and others, are discussed in more detail below.

In some embodiments, multicarrier transmitter 100 may also comprise encoder 102 to generate sequence of encoded bits 103 from uncoded bit sequence 101. In some embodiments, encoder 102 may be an error-correcting encoder, such as an FEC encoder, and in other embodiments, encoder 102 may be a convolutional encoder, although the scope of the invention is not limited in this respect.

In some embodiments, multicarrier transmitter 100 may further comprise inverse fast Fourier transform (IFFT) circuitry 108 to generate signals for subsequent transmission on a corresponding one of the spatial channels or a corresponding one of transmit antennas 112 from space-frequency mapped symbols 107 provided by block coder 106. In some embodiments, the output signals of IFFT circuitry 108 may be packetized signals for transmission. In some embodiments, circuitry may be included in the signal path after IFFT circuitry 108 to add a cyclic prefix (CP) to help reduce intersymbol interference, although the scope of the present invention is not limited in this respect. In some embodiments, each of transmit antennas 112 may correspond to one of the spatial channels, although the scope of the present invention is not limited in this respect.

In some embodiments, multicarrier transmitter 100 may also include radio-frequency (RF) circuitry 110 to generate RF signals for transmitting the time-domain modulated precoded symbols provided by corresponding IFFT circuitry 108 on the subcarriers of the multicarrier communication channel. In some embodiments, RF circuitry 110 may be associated with one of the transmit antennas 112, although the scope of the invention is not limited in this respect.

Although multicarrier transmitter 100 is illustrated with only two transmit antennas 112, two corresponding RF circuitry 110 and two corresponding IFFT circuitry 108, the scope of the present invention is not limited in this respect. In some embodiments, multicarrier transmitter 100 may have up to four or more of antennas 112, corresponding RF circuitry 110 and corresponding IFFT circuitry 108 depending on the number of differing spatial streams that may be able to be communicated. In some embodiments, multicarrier transmitter 100 may be part of a multicarrier communication station that includes multicarrier receiver circuitry. These embodiments are discussed in more detail below.

In some embodiments, multicarrier transmitter 100 may refrain from performing space-frequency interleaving and may perform space-frequency block coding. In some embodiments, multicarrier transmitter 100 may refrain from performing space-frequency block coding and may perform space-frequency interleaving. In some embodiments, multicarrier transmitter 100 may perform both space-frequency interleaving and space-frequency block coding. In these various embodiments, multicarrier transmitter 100 may indicate whether space-frequency interleaving and/or space-frequency block coding is being performed to the receiving station.

Figure 2:
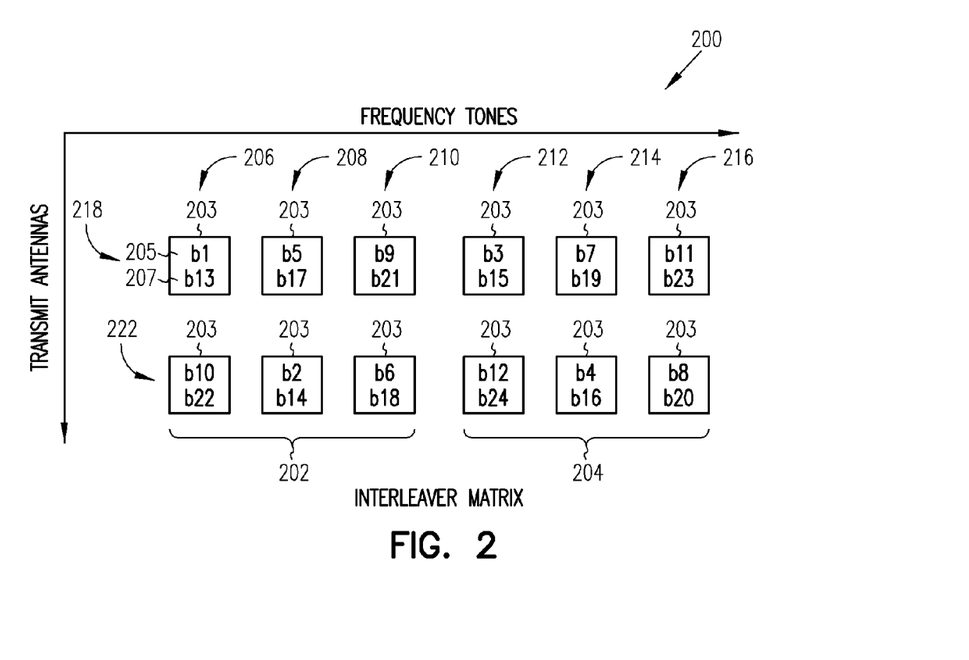
FIG. 2 illustrates space-frequency interleaving in accordance with some embodiments of the present invention.

FIG. 2 illustrates space-frequency interleaving in accordance with some embodiments of the present invention. Matrix 200 may represent an interleaver matrix used by space-frequency interleaver 104 (FIG. 1) to perform space-frequency interleaving in accordance with embodiments of the present invention. In some embodiments, rows 218 and 222 of the interleaver matrix 200 may correspond to a number of spatial channels and/or a number of transmit antennas 112 (FIG. 1) used for transmission by multicarrier transceiver 100 (FIG. 1). In some embodiments, columns 206-216 of interleaver matrix 200 may correspond to a number of subcarriers of the multicarrier communication channel. For ease of understanding, interleaver matrix 200 illustrates an example of interleaving performed for two transmit antennas and six subcarriers, however embodiments of the present invention include interleaving with up to sixty-four or more subcarriers and up to four or more spatial channels and/or transmit antennas.

In matrix 200, bits of a bit sequence, such as encoded bit sequence 103 (FIG. 1), are illustrated as bits $b_1, b_2 \ldots b_{20}$, in which the subscripts represent the order of the bits in a sequence provided by an encoder, such as encoder 102 (FIG. 1). In accordance with some embodiments, space-frequency interleaver 104 (FIG. 1) may assign two or more non-sequential bits (e.g., bits $b_1$ & $b_{13}$) of an encoded bit sequence to matrix positions 203 of interleaver matrix 200. In some embodiments, the two or more bits assigned to each matrix position 203 may comprise a coded symbol, such as an FEC-coded QAM symbol. In some embodiments, space-frequency interleaver 104 (FIG. 1) may assign sequential bits (e.g., bits $b_1$, $b_2$, etc.) of encoded bit sequence 103 (FIG. 1) diagonally within frequency blocks 202, 204 of the interleaver matrix 200. For example, first bits 205 of each of the symbols may be assigned in a diagonal manner across first frequency block 202 and then across second frequency block 204. First bits 205 may be a first portion of the sequential bits of encoded bit sequence 103 (FIG. 1). The space-frequency interleaver 104 (FIG. 1) may also assign second bits 207 of each of the symbols in the diagonal manner across first frequency block 202 and then across second frequency block 204. Second bits 207 may be a next portion of the sequential bits of the encoded bit sequence. In this example, each of the symbols may comprise a bit from first bits 205 and a bit from second bits 207, although the scope of the invention is not limited in this respect.

In some embodiments, the number of frequency blocks may be selected to increase diversity among the subcarriers and transmit antennas. In some embodiments, a frequency block may be selected to have up to two or more times as many columns (e.g., subcarrier frequencies) as rows (e.g., spatial channels or transmit antennas), although the scope of the invention is not limited in this respect.

Although symbols associated with matrix positions 203 are illustrated as having two bits per symbol (i.e., quadrature phase shift keying (QPSK) modulation) and are referred to sometimes as QAM symbols, other modulation levels may also be suitable. For example, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol, may also be suitable. Furthermore, modulation levels with higher data communication rates per subcarrier may also be used.

In some embodiments, space-frequency interleaver 104 (FIG. 1) may provide vectors 105 (FIG. 1) to space-frequency block coder 106 (FIG. 1). In these embodiments, each of vectors 105 (FIG. 1) may include the bits that may be represented by the symbols associated with matrix positions 203 from one of the rows (e.g., row 218 or 222) of matrix 200 which may correspond to one of the spatial channels.

Figure 3:
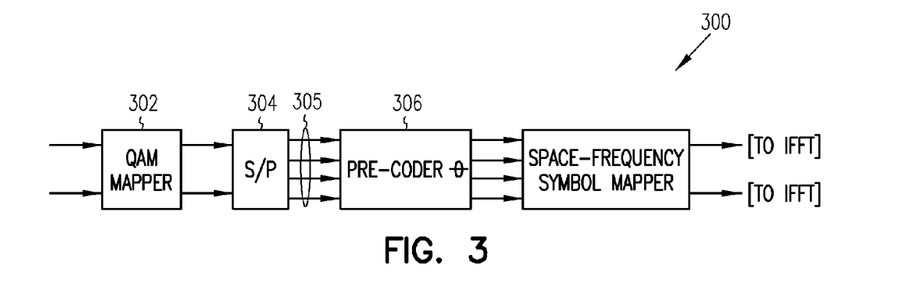
FIG. 3 is a block diagram of a space-frequency block coder in accordance with some embodiments of the present invention.

FIG. 3 is a block diagram of a space-frequency block coder in accordance with some embodiments of the present invention. Space-frequency block coder 300 may be suitable for use as space-frequency block coder 106 (FIG. 1), although other configurations for space-frequency block coding may also be suitable. In accordance with some embodiments, space-frequency block coder 300 may precode groups of the symbols, such as groups of symbols from matrix positions 203 (FIG. 2), which may be groups of FEC-coded QAM symbols. In some embodiments, space-frequency block coder 300 may also map the precoded symbols to one of a plurality of subcarriers of a multicarrier communication channel and one of a plurality of spatial channels for transmission to a multicarrier receiving station.

In some embodiments, space-frequency block coder 300 may include bit mapper 302 to map the two or more bits (e.g., bits $b_1$, & $b_{13}$ (FIG. 2)) assigned to matrix positions 203 (FIG. 2) of interleaver matrix 200 (FIG. 2) to generate the coded symbols. In some embodiments, bit mapper 302 may generate the coded QAM symbols, although the scope of the invention is not limited in this respect.

Space-frequency block coder 300 may also include serial-to-parallel converter 304 to generate a plurality of parallel symbol vectors 305 from the serial symbol stream. Each of the symbol vectors may have more than one symbol. In some embodiments parallel symbol vectors 305 may comprise groups of coded symbols for preceding.

Space-frequency block coder 300 may also include precoder 306 to precode groups of coded symbols from symbol vectors 305. Space-frequency block coder 300 may also include space-frequency symbol mapper to map precoded symbols to one of a plurality of subcarriers of a multicarrier communication channel and to one of a plurality of spatial channels. This is discussed in more detail below.

Figure 4:
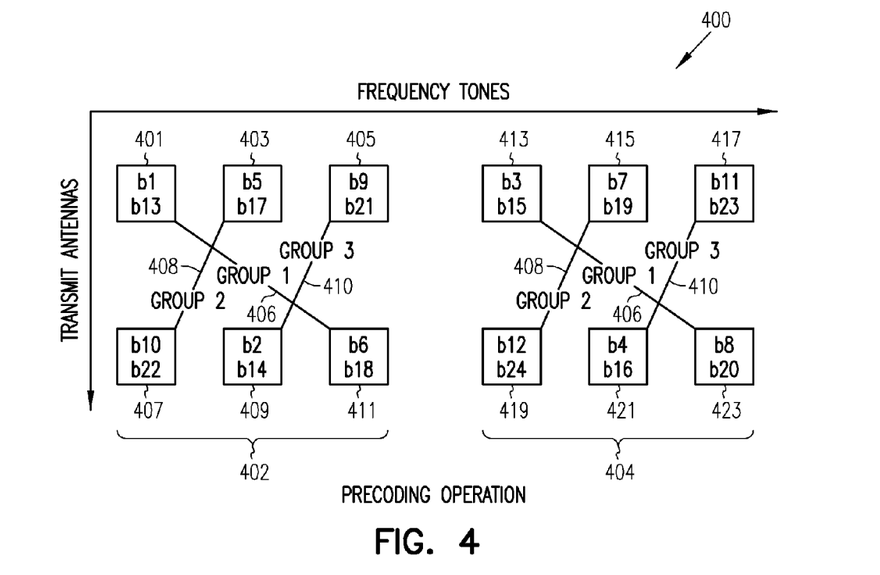
FIG. 4 illustrates precoding in accordance with some embodiments of the present invention.

FIG. 4 illustrates preceding in accordance with some embodiments of the present invention. In some embodiments, the operations illustrated by FIG. 4 may be performed by precoder 306 (FIG. 3), although other precoders may also be suitable. Matrix 400 illustrates an antenna-subcarrier assignment matrix in which the number of columns may correspond to a number of subcarriers of the multicarrier communication channel and the number of rows may correspond to a number of spatial channels. In some embodiments, the coded symbols assigned to positions of matrix 400 may correspond to matrix positions 203 (FIG. 2) of interleaver matrix 200 (FIG. 2), although the scope of the invention is not limited in this respect.

In some embodiments, precoder 306 (FIG. 3) may select a group of coded symbols for preceding together from diagonal matrix positions within more than one frequency block of matrix 400. The coded symbols may be associated with matrix positions 203 (FIG. 2). For example, precoder 306 may precode together symbols of each of groups 406, 408, and 410. In some embodiments, each group may comprise a plurality of non-precoded QAM symbols selected from diagonal positions within more than one frequency block (e.g., frequency blocks 402, 404).

After precoding, each precoded symbol may comprise substantially a linear combination of symbols (e.g., non-precoded QAM symbols) from matrix positions 203 (FIG. 2) of an associated group. For example, first group 406 (i.e., group one) may comprise four symbols 401, 411, 413 and 423 (e.g., non-precoded QAM symbols). After preceding, the four precoded symbols that result may be linear combinations of the four coded symbols 401, 411, 413 and 423, although the scope of the invention is not limited in this respect. Second group 408 (i.e., group 2) may comprise four symbols 403, 407, 415 and 419 (e.g., non-precoded QAM symbols). A third group (i.e., group 3) may comprise four symbols 405, 409, 417 and 421 (e.g., non-precoded QAM symbols). The output of precoder 306 (FIG. 3) may be precoded symbols associated with each position of matrix 400.

In some embodiments, the non-precoded symbols selected for a precoding group may be selected from diagonal positions within more than one frequency block of matrix 400. In these embodiments, the diagonal positions may be different from how the encoded bits were assigned diagonally for interleaving so that any group doesn't include symbols generated from sequential bits. For example, because symbols 401 and 409 are in diagonal matrix positions and comprise symbols generated from sequential bits (e.g., $b_1$ and $b_2$), symbols 401 and symbol 409 may be selected to be in different precoding groups. In this example, symbol 401 is selected for first group 406 and symbol 409 is selected for third group 410, although the scope of the invention is not limited in this respect.

In some embodiments, the symbols selected for precoding groups may be anti-diagonal (opposite direction diagonals) with respect to the interleaving of sequential bits by space-frequency interleaver 104 (FIG. 1).

In some embodiments, precoder 306 (FIG. 3) may encode the groups of symbols (e.g., a symbol vector) by multiplying each of the symbol vectors by a complex field matrix to generate precoded symbol vectors. In some embodiments, precoder 306 (FIG. 3) may be a linear-square precoder. In some embodiments, the complex field matrix may be a square complex field matrix having substantially a row-wise Vandermonde structure, although the scope of the invention is not limited in this respect.

Referring to FIG. 1, in some embodiments, the spatial channels used for transmitting spatial streams may be at least partially correlated (i.e., non-orthogonal in frequency) channels. In these embodiments, each spatial channel may employ the same frequency symbol-modulated subcarriers. In some embodiments, non-correlation (i.e., partial orthogonality) between the spatial channels may be achieved through antenna separation. In some embodiments, transmit antennas 112 may have a spacing therebetween of at least approximately a half-wavelength of a transmit frequency, although the scope of the invention is not limited in this respect. In some embodiments, the antenna spacing may be selected so that the different antennas undergo uncorrelated channel fading. In some embodiments, space-frequency interleaving and/or high-throughput space-frequency block codes employed by multicarrier transceiver 100 may reduce sensitivity to smaller antenna spacing or separations, and may be robust to antenna fading correlations. In some embodiments, the antenna separation may be small relative to the wavelength of transmission. In some embodiments, non-correlation between the spatial channels may be achieved through beamforming, although the scope of the invention is not limited in this respect.

Is some embodiments, the multicarrier communication channel may comprise a plurality of symbol-modulated subcarriers. In some embodiments, each symbol-modulated subcarrier may have a null at substantially a center frequency of the other subcarriers to achieve substantial orthogonality between the subcarriers of the multicarrier communication channel. In some embodiments, the multicarrier communication channel may be an orthogonal frequency division multiplexed (OFDM) communication channel comprising a plurality of OFDM subcarriers, although the scope of the invention is not limited in this respect.

In some embodiments, transmit antennas 112 may be used to divide the channel into more than one spatial channel. In some embodiments, each transmit antenna 112 may define one spatial transmit channel. In other embodiments, multicarrier transmitter 100 may employ beamforming techniques to divide the channel into spatial channels. In some embodiments, each spatial channel may be used to communicate separate or independent data streams on the same subcarriers as the other spatial channels allowing the communication of additional data without an increase in frequency bandwidth. The use of spatial channels may take advantage of the multi-path characteristics of the channel.

In some embodiments, the frequency spectrums for a multicarrier communication channel may comprise subcarriers in either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In ultra-wideband (UWB) embodiments, the frequency spectrum for a multicarrier communication channel may comprise a wider frequency spectrum.

Figure 5:
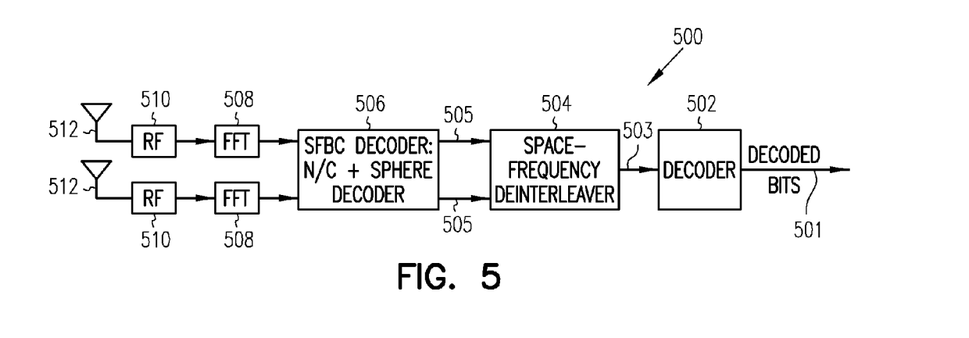
FIG. 5 is a block diagram of a multicarrier receiver in accordance with some embodiments of the present invention.

FIG. 5 is a block diagram of a multicarrier receiver in accordance with some embodiments of the present invention. Multicarrier receiver 500 may be part of a wireless communication device and may receive multicarrier communication signals, such as OFDM communication signals, over a multicarrier communication channel. In some embodiments, multicarrier receiver 500 may be part of a communication station which may also comprise a multicarrier transmitter, such as multicarrier transmitter 100 (FIG. 1), although other multicarrier transmitters may also be suitable.

In some embodiments, multicarrier receiver 500 may receive signals over a multicarrier communication channel over more than one spatial channel and may use more than one of receive antennas 512. In some embodiments, multicarrier receiver 500 may decode signals that may have been encoded using space-frequency interleaving and/or with high-throughput space-frequency block coding by a multicarrier transmitter, such as transmitter 100 (FIG. 1), although other multicarrier transmitters may also be suitable to encode signals for reception by multicarrier receiver 500.

In some embodiments, the use of space-frequency interleaving and/or space-frequency block coding may help reduce the need for convolutional or error-correcting decoding, although the scope of the present invention is not limited in this respect. In some embodiments, the use of space-frequency interleaving and/or space-frequency block coding may help reduce the need for Viterbi decoding, although the scope of the invention is not limited in this respect. In some embodiments, increased throughput and/or increased range may be achieved through the use of space-frequency interleaving and/or high-throughput space-frequency block codes over systems using convolutional codes with similar bit-error rates and bandwidths. In some embodiments, multicarrier receiver 500 may decode signals received over a multicarrier communication channel encoded with high-throughput space-frequency block codes using an iterative nulling process to successively cancel interference.

In some embodiments, multicarrier receiver 500 may comprise decoder 506. Decoder 506 may be a space-frequency block code (SFBC) decoder which may comprise a sphere decoder and a null canceller. The null canceller may perform an iterative null canceling process on a per-subcarrier basis to cancel interference caused by other subcarriers. The sphere decoder may decode symbols within a layer after interference in cancelled from other layers by the null canceller.

In some embodiments, decoder 506 may decode null-cancelled symbol vectors after the iterative null canceling processing is performed. In some embodiments, decoder 506 may include a sphere decoder to spherically decode layers of symbols of an associated group and may to multiply an output of the sphere decoder (i.e., one decoded layer at a time) by a complex-field matrix. In this way, decoder 506 may regenerate a precoded symbol vector (e.g., to regenerate the current layer) for the null cancellation process so that a current layer's contribution may be cancelled until all layers are decoded. In some embodiments, nulling may be done once for each subcarrier while canceling may be done for iterations until all layers are decoded, although the scope of the invention is not limited in this respect. In some embodiments, the sphere decoder may perform maximum-likelihood (ML) detection within a sphere or spherical limit, unlike an exhaustive ML detection. In some embodiments, the decoder 506 may generate decoded symbol vectors 505 for each subcarrier of the multicarrier communication channel. In some embodiments, symbol vectors 505 may be QAM symbol vectors.

In some embodiments, the null cancellation process may null symbols so that the $i^{th}$ layer may still have interference from the first layer through the $i^{th}-1$ layer, and substantially no interference from the $i^{th}+1$ layer to the $M^{th}$ layer within a symbol vector for a specific subcarrier frequency, although the scope of the invention is not limited in this respect. M may equal the number of transmit antennas. In some embodiments, the null cancellation process may also cancel some elements in symbol vectors after nulling based on a null cancelled symbol vector. This process may be performed successively until all layers are decoded. In some embodiments, this may be an iterative process.

In some embodiments, multicarrier receiver 500 may also comprise space-frequency deinterleaver 504. In these embodiments, space-frequency deinterleaver 504 may receive groups of bits associated with coded symbols (which may be QAM symbols) in the form of vectors 505 associated with each spatial channel. The bits associated with each coded symbol may be assigned to a matrix position of a deinterleaver matrix for deinterleaving. In some embodiments, the bits for each spatial channel may be assigned across the columns of the matrix and may be read from the matrix in a diagonal manner across each frequency block of the matrix. For example, the deinterleaving matrix may be similar to matrix 200 (FIG. 2) and first bits 205 (FIG. 2) may be read first (e.g., bits $b_1$, $b_2$, $b_3$, $b_4$ . . . ) from diagonal positions of each frequency block, and then second bits 207 (FIG. 2) may be read second (e.g., bits $b_{13}$, $b_{14}$, $b_{15}$, $b_{16}$) from diagonal positions of each frequency block. As a result, space-frequency deinterleaver 504 may generate encoded bit sequence 503 comprising a sequence of bits that may correspond to sequence of bits 103 (FIG. 1).

In some embodiments, multicarrier receiver 500 may also comprise decoder 502 to generate sequence of decoded bits 501 from encoded bit sequence 503. In some embodiments, decoder 502 may be an error-correcting decoder, such as a forward error correcting (FEC) decoder, and in other embodiments, encoder 502 may be a convolutional decoder, although the scope of the invention is not limited in this respect.

In some embodiments, multicarrier receiver 500 may also comprise FFT circuitry 508 to demodulate subcarriers of the multicarrier communication channel received through receive antennas 512 to generate the received symbol vectors associated with each receive antenna. The received symbol vectors (i.e., from each antenna 512) may include symbol components from each of the subcarriers of the multicarrier communication channel. In some embodiments, the number of receive antennas 512 may be greater than or equal to the number of transmit antennas or spatial channels used in transmitting the multicarrier communication signal, although the scope of the present invention is not limited in this respect.

In some embodiments, multicarrier receiver 500 may also comprise a symbol demapper as part of decoder 506 to demap the decoded symbol vectors and generate bits for deinterleaving by deinterleaver 504. In some embodiments, circuitry (not illustrated) may be included in the signal path before FFT circuitry 508 to remove a cyclic prefix (CP) added by the transmitter to help reduce inter-symbol interference, although the scope of the present invention is not limited in this respect. In some embodiments, multicarrier receiver 500 may include RF circuitry 510 to demodulate RF signals received by antennas 512 over the multicarrier communication channel. In some embodiments, RF circuitry 510 may provide time-domain symbol-modulated subcarriers to FFT circuitry 508.

In some embodiments, multicarrier transmitter 100 (FIG. 1) and/or multicarrier receiver 500 may be part of a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, multicarrier transmitter 100 (FIG. 1) may transmit and multicarrier receiver 500 may receive radio-frequency (RF) communications in accordance with specific communication standards, such as the Institute of Electrical and Electronics Engineers (IEEE) standards including IEEE 802.11(a), 802.11(b), 802.11(g/h) and/or 802.11(n) standards for wireless local area networks (WLANs) and/or 802.16 standards for wireless metropolitan area networks (WMANs), although transmitter 100 (FIG. 1) and/or receiver 500 may also be suitable to transmit and/or receive communications in accordance with other techniques including the Digital Video Broadcasting Terrestrial (DVB-T) broadcasting standard, and the High performance radio Local Area Network (HiperLAN) standard.

Although some embodiments of the present invention are discussed in the exemplary context of an 802.11x implementation (e.g., 802.11a, 802.11g, 802.11 HT, etc.), the claims are not so limited. Some embodiments of the present invention may be implemented as part of any wireless system using multicarrier wireless communication channels (e.g., orthogonal frequency-division multiplexing (OFDM), discrete multitone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

In some embodiments, each of transmit antennas 112 (FIG. 1) and each of receive antennas 512 may comprise a directional or omnidirectional antenna, including, for example, a dipole antenna, a monopole antenna, a loop antenna, a microstrip antenna or other type of antenna suitable for reception and/or transmission of RF signals.

In some embodiments, multicarrier transmitter 100 (FIG. 1) and/or multicarrier receiver 500 may be part of a single multicarrier communication station. Although multicarrier transmitter 100 (FIG. 1) and/or multicarrier receiver 500 may be part of one or more wireless communication devices, multicarrier transmitter 100 (FIG. 1) and/or multicarrier receiver 500 may be part of almost any wireless or wireline communication device, including a general purpose processing or computing system. In some embodiments, multicarrier transmitter 100 (FIG. 1) and/or multicarrier receiver 500 may be part of a battery-powered device. In some embodiments, when transmitter 100 (FIG. 1) and receiver 500 are part of a single communication station, transmit and receive antennas may be shared, although the scope of the invention is not limited in this respect.

Although multicarrier transmitter 100 (FIG. 1), space-frequency block coder 300 (FIG. 3) and multicarrier receiver 500 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Figure 6:
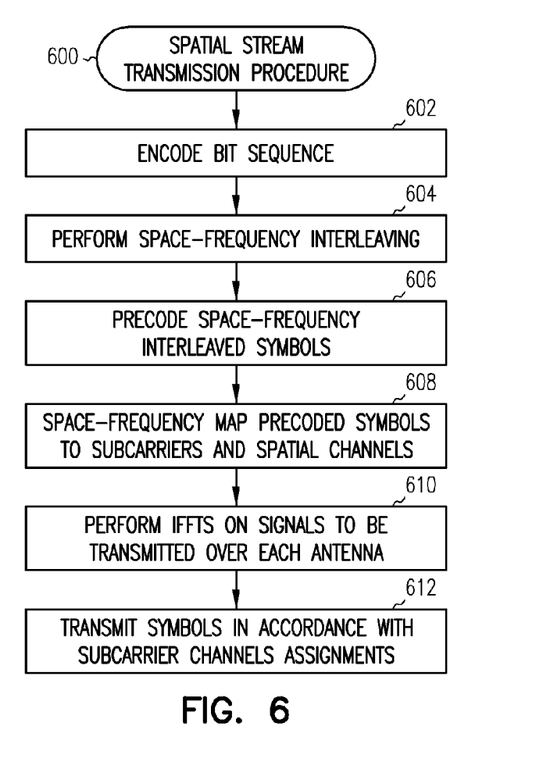
FIG. 6 is a flow-chart of a spatial-stream transmission procedure in accordance with some embodiments of the present invention.

FIG. 6 is a flow-chart of a spatial-stream transmission procedure in accordance with some embodiments of the present invention. Spatial-stream transmission procedure 600 may be performed by a multicarrier transmitter, such as multicarrier transmitter 100 (FIG. 1), although other multicarrier transmitter configurations may also perform procedure 600.

Operation 602 encodes a bit stream to generate an encoded bit sequence. Operation 602 may use an error-correcting code, although the scope of the invention is not limited in this respect. In some embodiments, operation 602 may be performed by encoder 102 (FIG. 1).

Operation 604 performs space-frequency interleaving by assigning two or more non-sequential bits of an encoded bit sequence to matrix positions of an interleaver matrix. The two or more bits assigned to each matrix position may comprise coded symbol, such as an FEC-coded QAM symbol (e.g., non-precoded symbol). In some embodiments, the interleaver matrix may be defined by a number of transmit antennas used for transmission and a number of subcarriers of the multicarrier communication channel, although the scope of the invention is not limited in this respect. In some embodiments, operation 604 may be performed by space-frequency interleaver 104 (FIG. 1).

In some embodiments, operation 602 assigns sequential bits of the encoded bit sequence diagonally within frequency blocks of the interleaver matrix. In some embodiments, operation 604 selects the coded symbols for precoding together generated from diagonal positions within more than one frequency block of the interleaver matrix.

Operation 606 performs space-frequency block coding by precoding the coded symbols, which may be FEC-coded QAM symbols. In some embodiments, operation 606 comprises precoding groups of the coded symbols. In some embodiments, each group may comprise a plurality of the coded symbols selected from diagonal positions within more than one frequency block of an antenna-subcarrier assignment matrix. In some embodiments, each precoded symbol may comprise substantially a linear combination of the coded symbols of an associated group. In some embodiments, operation 606 may be performed by space-frequency block coder 106 (FIG. 1).

Operation 608 maps precoded symbols to one of a plurality of subcarriers of a multicarrier communication channel and one of a plurality of spatial channels and/or transmit antennas. In some embodiments, operation 608 comprises mapping the precoded symbols to one of the plurality of subcarriers of the multicarrier communication channel and to one of the plurality of spatial channels based on an associated encoded symbol's assignment in the interleaver matrix. In some embodiments, operation 608 may be performed by space-frequency block coder 106 (FIG. 1).

Operation 610 performs inverse fast Fourier transforms to modulate the precoded symbols for subsequent transmission on one of the plurality of subcarriers of the multicarrier communication channel and by one of a plurality of transmit antennas corresponding to the spatial channels. In some embodiments, operation 610 may be performed by IFFT circuitry 108 (FIG. 1).

Operation 612 may also comprise generating radio-frequency signals from the modulated precoded symbols. Operation 612 may also comprise transmitting the modulated precoded symbols on the subcarriers of the multicarrier communication channel. In some embodiments, operation 612 may be performed by RF circuitry 110 (FIG. 1).

Figure 7:
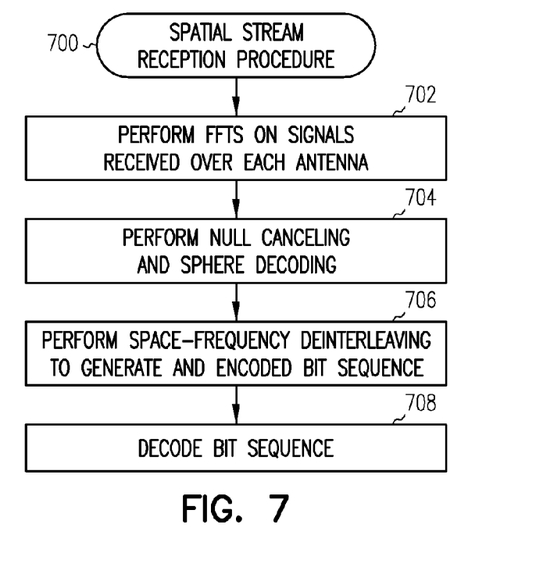
FIG. 7 is a flow-chart of a spatial-stream reception procedure in accordance with some embodiments of the present invention.

FIG. 7 is a flow-chart of a spatial-stream reception procedure in accordance with some embodiments of the present invention. Spatial-stream reception procedure 700 may be performed by a multicarrier receiver, such as multicarrier receiver 500 (FIG. 5), although other receiver configurations may also be used to perform procedure 700. Procedure 700 may be used to separate and decode multicarrier signals transmitted over a multicarrier channel comprising a plurality of spatial channels. In embodiments, space-frequency interleaving and/or space frequency block coding may have been performed prior to transmission.

Operation 702 performs FFTs on signals received over each antenna of a multicarrier receiver. The frequency domain signals generated by operation 702 may include signal components from each subcarrier of the multicarrier channel and signal components from each spatial channel or transmit antenna used in transmitting the multicarrier signal. In some embodiments, operation 702 may be performed by FFT circuitry 508 (FIG. 5).

Operation 704 performs a null cancellation process and a sphere decoding process to generate coded symbols (e.g., coded QAM symbols) associated with each spatial channel and each subcarrier. In some embodiments, operation 704 may iteratively cancel interference from a received multicarrier signal on a per subcarrier basis and generate symbol vectors associated with each of a plurality of subcarriers and each a plurality of spatial channels to generate two or more bits associated with each of a plurality of antenna-subcarrier transmission assignments. In some embodiments, operation 704 may be performed by decoder 506 (FIG. 5).

Operation 706 space-frequency deinterleaves the bits generated by operation 704. In some embodiments, operation 706 may deinterleave the two or more bits associated with the antenna-subcarrier assignments in a diagonal manner across frequency blocks of a deinterleaver matrix. In some embodiments, operation 706 assigns bits of the two or more bits associated with antenna-subcarrier assignments to a deinterleaver matrix and reads the bits diagonally from within frequency blocks of the deinterleaver matrix to generate an encoded bit sequence for subsequent error-correcting decoding. In some embodiments, operation 706 may be performed by space-frequency deinterleaver 504 (FIG. 5).

Operation 708 decodes an encoded sequence of bits generated by operation 706 to generate a decoded sequence of bits. In some embodiments, operation 708 may be performed by decoder 502 (FIG. 5).

Although the individual operations of procedures 600 (FIG. 6) and 700 are illustrated and described as separate operations, one or more of the individual operations may be performed concurrently, and nothing requires that the operations be performed in the order illustrated.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A multicarrier transmitter comprising:
    a space-frequency interleaver to assign two or more non-sequential bits of an encoded bit sequence to matrix positions of an interleaver matrix, wherein the two or more non-sequential bits assigned to each matrix position comprise a coded symbol; and
    a space-frequency coder to precode the coded symbols and to map the precoded symbols to one of a plurality of subcarriers of a multicarrier communication channel and to one of a plurality of spatial channels,
    wherein the space-frequency interleaver assigns sequential bits of the encoded bit sequence diagonally within frequency blocks of the interleaver matrix.

2. The multicarrier transmitter of claim 1 wherein the space-frequency coder selects the coded symbols for precoding together from diagonal positions generated from more than one of the frequency blocks of the interleaver matrix.

3. The multicarrier transmitter of claim 2 wherein the space-frequency coder comprises a precoder to precode groups of the coded symbols, each group comprising a plurality of the coded symbols selected from the diagonal positions within more than one of the frequency blocks of an antenna-subcarrier assignment matrix, each precoded symbol comprising substantially a linear combination of the coded symbols of an associated group.

4. The multicarrier transmitter of claim 3 wherein the precoder encodes a plurality of symbol vectors by multiplying each of the symbol vectors by a complex field matrix to generate precoded symbol vectors, each symbol vector comprising quadrature amplitude modulated symbols of one of the groups.

5. The multicarrier transmitter of claim 1 wherein the interleaver matrix is defined by a number of transmit antennas used for transmission and a number of subcarriers of the multicarrier communication channel.

6. The multicarrier transmitter of claim 1 wherein the space-frequency coder comprises a space-frequency symbol mapper to map the precoded symbols to one of the plurality of subcarriers of the multicarrier communication channel and to one of the plurality of spatial channels.

7. The multicarrier transmitter of claim 1 wherein the space-frequency coder comprises a bit mapper to map the two or more non-sequential bits assigned to the matrix positions of the interleaver matrix to generate the coded symbols.

8. The multicarrier transmitter of claim 1 further comprising an error-correcting encoder to generate the encoded bit sequence from an uncoded bit sequence.

9. The multicarrier transmitter of claim 1 further comprising inverse fast Fourier transform circuitry to modulate the precoded symbols for subsequent radio-frequency transmission on one of the plurality of subcarriers of the multicarrier communication channel and by one of a plurality of transmit antennas corresponding to one of the plurality of spatial channels.

10. The multicarrier transmitter of claim 9 further comprising radio-frequency circuitry associated with one of the transmit antennas to generate radio-frequency signals for transmitting modulated precoded quadrature amplitude modulated symbols on the subcarriers of the multicarrier communication channel.

11. The multicarrier transmitter of claim 1 wherein the multicarrier communication channel comprises the plurality of spatial channels, each spatial channel associated with one of a plurality of transmit antennas,
wherein each spatial channel employs the same frequency subcarriers as the other spatial channels, and
wherein the transmit antennas have a spacing therebetween of at least approximately a half-wavelength of a transmit frequency.

12. The multicarrier transmitter of claim 11 wherein the multicarrier communication channel comprises a plurality of symbol-modulated subcarriers, and
wherein each symbol-modulated subcarrier has a null at substantially a center frequency of the other subcarriers to achieve substantial orthogonality between the subcarriers of the multicarrier communication channel.

13. The multicarrier transmitter of claim 1 further comprising circuitry to selectively refrain from either: performing space-frequency interleaving by the space-frequency interleaver, or performing space-frequency encoding by the space-frequency coder.

14. The multicarrier transmitter of claim 1 wherein the multicarrier transmitter is part of a multicarrier communication station comprising the multicarrier transmitter and a multicarrier receiver,
wherein the multicarrier receiver comprises:
a decoder including a null canceller to iteratively cancel interference from received multicarrier signals on a per subcarrier basis and generate symbol vectors associated with each of the subcarriers and each of the spatial channels, the decoder further including a sphere decoder to decode groups of symbols across frequency blocks; and
a space-frequency deinterleaver to deinterleave bits in a diagonal manner across frequency blocks of a deinterleaver matrix, the bits being assigned positions in the deinterleaver matrix by the decoder.

15. A method of transmitting comprising:
space-frequency interleaving by assigning two or more non-sequential bits of an encoded bit sequence to matrix positions of an interleaver matrix, wherein the two or more non-sequential bits assigned to each matrix position comprise a coded symbol; and
performing space-frequency coding by precoding the coded symbols; and mapping the precoded symbols to one of a plurality of subcarriers of a multicarrier communication channel and one of a plurality of spatial channels,
wherein assigning comprises assigning sequential bits of the encoded bit sequence diagonally within frequency blocks of the interleaver matrix.

16. The method of claim 15 wherein precoding comprises selecting the coded symbols for precoding together generated from diagonal positions within more than one of the frequency blocks of the interleaver matrix.

17. The method of claim 16 wherein precoding further comprises precoding groups of the coded symbols, each group comprising a plurality of the coded symbols selected from the diagonal positions within more than one of the frequency blocks of an antenna-subcarrier assignment matrix, each precoded symbol comprising substantially a linear combination of the coded symbols of an associated group.

18. The method of claim 15 wherein the interleaver matrix is defined by a number of transmit antennas used for transmission and a number of subcarriers of the multicarrier communication channel.

19. The method of claim 15 wherein space-frequency coding comprises mapping the precoded symbols to one of the plurality of subcarriers of the multicarrier communication channel and to one of the plurality of spatial channels based on an associated encoded symbol's assignment in the interleaver matrix.

20. A multicarrier receiver comprising:
a decoder to iteratively cancel interference from a received multicarrier signal on a per subcarrier basis and generate symbol vectors associated with each of a plurality of subcarriers and each a plurality of spatial channels, the decoder to further decode groups of symbols and generate two or more bits associated with antenna-subcarrier transmission assignments; and
a space-frequency deinterleaver to deinterleave the two or more bits associated with the antenna-subcarrier transmission assignments in a diagonal manner across frequency blocks of a deinterleaver matrix.

21. The multicarrier receiver of claim 20 wherein the decoder uses an iterative null cancellation process to cancel interference from subcarriers of the multicarrier signal, and wherein the space-frequency deinterleaver assigns bits of the two or more bits associated with the antenna-subcarrier transmission assignments to the deinterleaver matrix and reads the bits diagonally from within the frequency blocks of the deinterleaver matrix to generate an encoded bit sequence.

22. The multicarrier receiver of claim 21 further comprising a plurality of receive antennas, wherein a number of the receive antennas is greater than or equal to a number of spatial channels used to transmit the multicarrier signal.

23. A method of receiving a multicarrier signal comprising:
iteratively canceling interference from a received multicarrier signal on a per subcarrier basis and generate symbol vectors associated with each of a plurality of subcarriers and each of a plurality of spatial channels to generate two or more bits associated with each of a plurality of antenna-subcarrier transmission assignments; and
deinterleaving the two or more bits associated with the antenna-subcarrier transmission assignments in a diagonal manner across frequency blocks of a deinterleaver matrix.

24. The method of claim 23 wherein deinterleaving comprises assigning bits of the two or more bits associated with the antenna-subcarrier transmission assignments to the deinterleaver matrix and reading the bits diagonally from within the frequency blocks of the deinterleaver matrix to generate an encoded bit sequence.

25. The method of claim 24 further comprising receiving the multicarrier signal with a plurality of receive antennas, wherein a number of the receive antennas is greater than or equal to a number of spatial channels used to transmit the multicarrier signal.

26. A transmitter system comprising:
more than one substantially omnidirectional antennas; and
a multicarrier transmitter having a space-frequency interleaver and a space-frequency coder, the space-frequency interleaver to assign two or more non-sequential bits of an encoded bit sequence to matrix positions of an interleaver matrix,
wherein the two or more non-sequential bits assigned to each matrix position comprise a coded symbol, the space-frequency coder to precode the coded symbols and to map the precoded symbols to one of a plurality of subcarriers of a multicarrier communication channel and one of a plurality of spatial channels for transmission by the antennas, and
wherein the space-frequency interleaver assigns sequential bits of the encoded bit sequence diagonally within frequency blocks of the interleaver matrix.

27. The transmitter system of claim 26 wherein the space-frequency coder selects the coded symbols for precoding together from diagonal positions generated from more than one of the frequency blocks of the interleaver matrix.

28. The transmitter system of claim 27 wherein the space-frequency coder comprises a precoder to precode groups of the coded symbols, each group comprising a plurality of the coded symbols selected from the diagonal positions within more than one of the frequency blocks of an antenna-subcarrier assignment matrix, each precoded symbol comprising substantially a linear combination of the coded symbols of an associated group.

29. A computer-readable medium that stores instructions for execution by one or more processors to perform operations comprising:
space-frequency interleaving by assigning two or more non-sequential bits of an encoded bit sequence to matrix positions of an interleaver matrix, wherein the two or more non-sequential bits assigned to each matrix position comprise a coded symbol; performing space-frequency coding by precoding the coded symbols; and
mapping the precoded symbols to one of a plurality of subcarriers of a multicarrier communication channel and one of a plurality of spatial channels,
wherein assigning comprises assigning sequential bits of the encoded bit sequence diagonally within frequency blocks of the interleaver matrix.

30. The computer-readable medium of claim 29 wherein the operations further comprise selecting the coded symbols for precoding together generated from diagonal positions within more than one of the frequency blocks of the interleaver matrix.

31. The computer-readable medium of claim 30 wherein the operations further comprise precoding groups of the coded symbols, each group comprising a plurality of the coded symbols selected from the diagonal positions within more than one of the frequency blocks of an antenna-subcarrier assignment matrix, each precoded symbol comprising substantially a linear combination of the coded symbols of an associated group.

* * * * *